(12) United States Patent
Kager

(10) Patent No.: US 12,151,409 B2
(45) Date of Patent: Nov. 26, 2024

(54) DOUBLE BELT PRESS COMPRISING AT LEAST ONE PRESSING DEVICE

(71) Applicant: Berndorf Band GmbH, Berndorf (AT)

(72) Inventor: Franz Kager, Schwechat (AT)

(73) Assignee: Berndorf Band GmbH, Berndorf (AT)

( * ) Notice: Subject to any disclaimer, the term of this patent is extended or adjusted under 35 U.S.C. 154(b) by 161 days.

(21) Appl. No.: 17/786,660

(22) PCT Filed: Dec. 16, 2020

(86) PCT No.: PCT/AT2020/060468
§ 371 (c)(1),
(2) Date: Jun. 17, 2022

(87) PCT Pub. No.: WO2021/119701
PCT Pub. Date: Jun. 24, 2021

(65) Prior Publication Data
US 2023/0019655 A1 Jan. 19, 2023

(30) Foreign Application Priority Data

Dec. 19, 2019 (AT) .............................. A 51128/2019

(51) Int. Cl.
*B29C 43/36* (2006.01)
*B29C 43/22* (2006.01)
(Continued)

(52) U.S. Cl.
CPC .......... *B29C 43/361* (2013.01); *B29C 43/228* (2013.01); *B29C 43/48* (2013.01);
(Continued)

(58) Field of Classification Search
None
See application file for complete search history.

(56) References Cited

U.S. PATENT DOCUMENTS

| 3,942,927 A | 3/1976 | De Mets |
| 4,541,889 A * | 9/1985 | Held ...................... B30B 15/34 425/371 |

(Continued)

FOREIGN PATENT DOCUMENTS

| AT | 516 907 A1 | 9/2016 |
| CN | 107592834 A | 1/2018 |

(Continued)

OTHER PUBLICATIONS

International Search Report in PCT/AT2020/060468, mailed Apr. 15, 2021.

*Primary Examiner* — Jacob T Minskey
*Assistant Examiner* — Caroline Beha
(74) *Attorney, Agent, or Firm* — Collard & Roe, P.C.

(57) ABSTRACT

A double belt press has at least one press device having at least one pressing plate and at least one counter-pressure element for the pressing plate spaced from each other. Portions of first and second endless and driven metal belts are guided, opposite one another, through a press gap located between the pressing plate sides facing one another and the plate-shaped counter-pressure element. The press device has at least one pressing stamp having a pressing surface movable toward the counter-pressure element and back again. The first and second endless metal belt portions guided through the press gap are guided between the pressing surface of the at least one pressing stamp and the at least one counter-pressure element, and the pressing surface of the pressing stamp is smaller than a surface of the side of the at least one pressing plate facing the at least one counter-pressure element.

3 Claims, 3 Drawing Sheets

Figure 1:
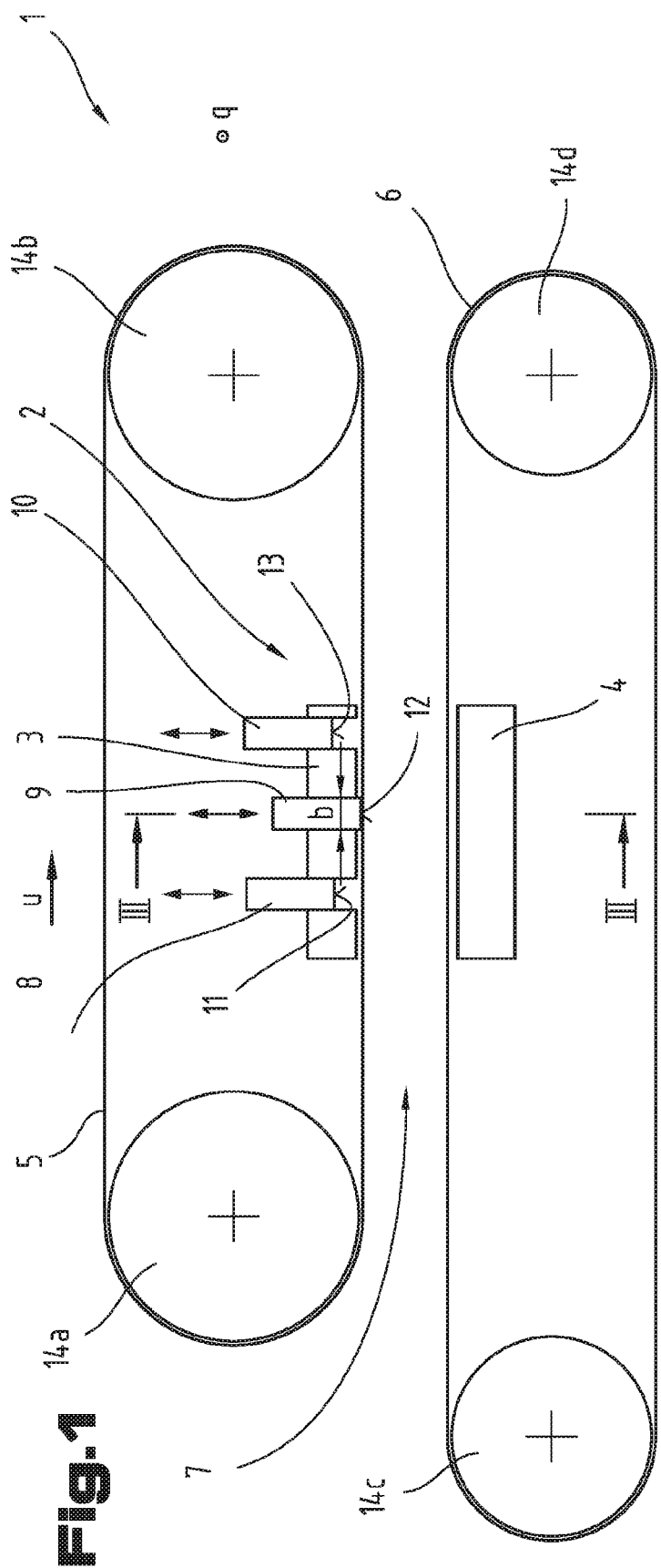

(51) Int. Cl.
*B29C 43/48* (2006.01)
*B30B 5/06* (2006.01)
*B30B 15/06* (2006.01)

(52) U.S. Cl.
CPC .............. *B30B 5/06* (2013.01); *B30B 15/064* (2013.01); *B29C 2043/3613* (2013.01); *B29C 2043/483* (2013.01)

(56) References Cited

U.S. PATENT DOCUMENTS

| | | | |
|---|---|---|---|
| 4,599,128 A | | 7/1986 | Held |
| 4,824,354 A | * | 4/1989 | Keaton ................... B30B 11/14 198/833 |
| 5,330,595 A | | 7/1994 | Held |
| 2017/0087787 A1 | | 3/2017 | Yun et al. |

FOREIGN PATENT DOCUMENTS

| | | | | |
|---|---|---|---|---|
| DE | 2922152 A1 | | 12/1980 | |
| DE | 30 13 231 A1 | | 10/1981 | |
| DE | 10227649 A1 | * | 1/2004 | .............. B27N 3/20 |
| DE | 10 2010 003 368 A1 | | 9/2011 | |
| EP | 0 144 822 A2 | | 6/1985 | |
| EP | 0 530 450 A1 | | 3/1993 | |
| EP | 1 435 281 A1 | | 7/2004 | |
| EP | 1 435 288 A2 | | 7/2004 | |
| EP | 1 676 696 A2 | | 7/2006 | |
| JP | S50-17513 B2 | | 6/1975 | |
| JP | S6058817 A | | 4/1985 | |
| JP | H04-45279 B2 | | 7/1992 | |
| JP | H06-344189 A | | 12/1994 | |
| JP | 2012-179638 A | | 9/2012 | |
| WO | WO-2022032907 A1 | * | 2/2022 | .............. B29C 65/20 |

\* cited by examiner

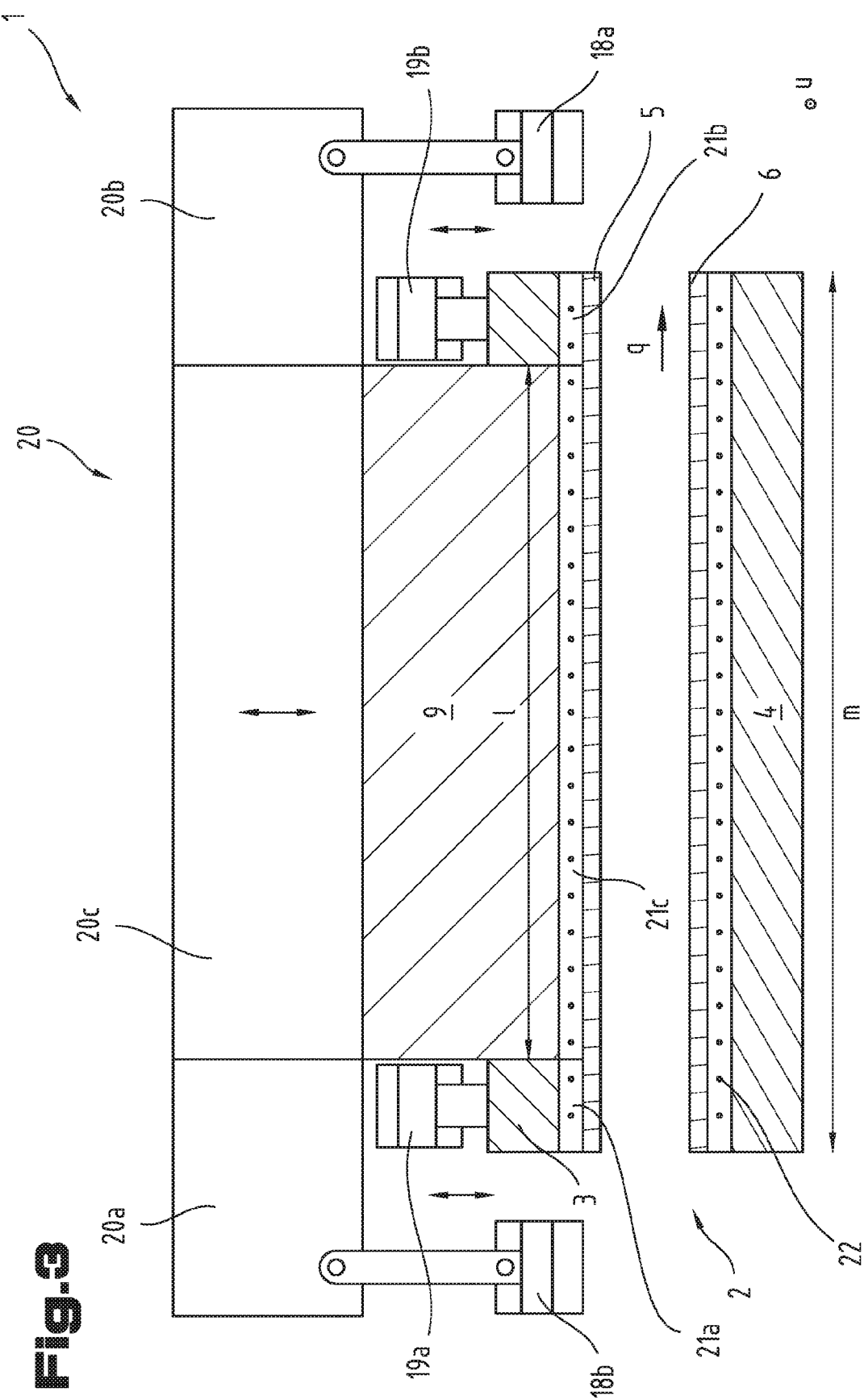

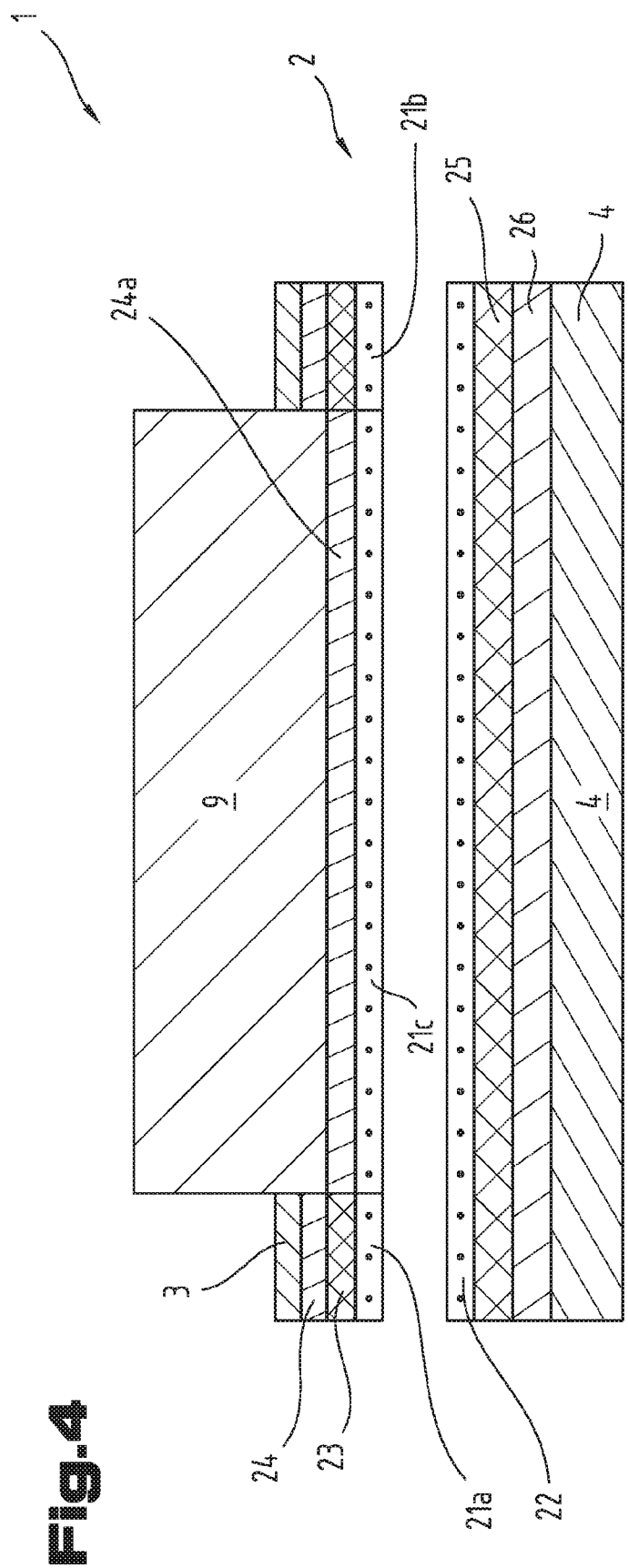

DOUBLE BELT PRESS COMPRISING AT LEAST ONE PRESSING DEVICE

CROSS REFERENCE TO RELATED APPLICATIONS

This application is the National Stage of PCT/AT2020/060468 filed on Dec. 16, 2020, which claims priority under 35 U.S.C. § 119 of Austrian Application No. A51128/2019 filed on Dec. 19, 2019, the disclosure of which is incorporated by reference. The international application under PCT article 21(2) was not published in English.

The invention relates to a double belt press having at least on press device, wherein the press device has at least one pressing plate and at least one counter-pressure element for the pressing plate, wherein the at least one pressing plate and the at least one counter-pressure element are spaced apart from one another, wherein portions of a first endless and driven metal belt and a second endless and driven metal belt are guided, opposite one another, through a press gap located between sides of the pressing plate facing one another and the counter-pressure element.

A relevant double belt press became known from AT516907A1. From EP 1 435 288, a double belt press of the type mentioned above became known.

For producing laminates from composite materials, such as foil-type laminates made from pre-impregnated tissues, Pre-preg, textile materials, fiber-reinforced materials etc., high pressures are required to eliminate trapped air and obtain a pore-free laminate. However, with conventional double belt presses, it is not possible to generate the pressure strengths in the press gap required to press air pockets out of a laminate positioned between the two belts, as the size of conventional pressing plates of double belt presses require very high forces, which causes the danger of the metal belts decelerating too much and reaching a standstill.

Therefore, it is the object of the invention to overcome the disadvantages of the prior art and to make a continuous production of laminates from composite materials possible.

This object is achieved with a double belt press of the type mentioned above by means of the measures according to the invention.

The solution according to the invention makes it possible to generate very high pressures due to the use of the pressing stamp. Due to the surface of the pressing stamp being smaller in comparison to the pressing plate, the occurring forces acting normal to a belt surface decrease accordingly here, whereby the danger of a deceleration of the metal belts leading to a standstill can be reduced and/or precluded. By means of the formation of the press device according to the invention, the production of laminates from composite materials by means of a double belt press is made possible. This entails the advantage that the laminates can be produced continuously, whereby the production can be made easier and more economical. Additionally, it is possible to produce laminates of any length. The invention also aids in achieving the advantage that a very high pressure can be generated in the region of the press gap over a great width of the metal belts. It is particularly preferred for the pressing surface to cover the entire product width. It can further be provided that the pressing surface extends over the entire belt width.

An embodiment according to which the at least one pressing plate has at least one pressing plate for the at least one pressing stamp has proven particularly advantageous, wherein the at least one pressing stamp is mounted so as to be displaceable through the at least one pressing plate. This embodiment makes the production of particularly high-quality laminates possible, as, on the one hand, the pressing plate allows a pre-compaction of the laminate, and the pressing stamp allows a very high compaction of the laminate requiring very little installation space. Furthermore, by the combination of the pressing plate with a pressing stamp, a warping of material immediately before the pressing stamp can be prevented, as the pressing plate prevents the material to be pressed from diverting in a direction normal to the belt surface.

A separate actuation of pressing plate and pressing stamp as well as the realization of optimal pressing conditions can be obtained by the at least one pressing stamp being connected to at least one first actuator, wherein the pressing plate is connected to at least one second actuator that can be actuated independently of the first actuator.

According to a preferred embodiment which is characterized by a compact construction and which is very advantageous for an efficient force transmission to the pressing stamp, it can be provided that the at least one pressing stamp is mounted on a frame protruding laterally beyond the at least one pressing plate when viewed in the belt transverse direction of the two metal belts.

Obtaining a good force transmission to the pressing stamp in a compact installation space is facilitated by the fact that the at least one first actuator is hinged to a section of the frame protruding laterally beyond the pressing plate when viewed in the belt transverse direction of the two metal belts.

An optimal force transmission can be obtained by a section of the frame arranged directly above the pressing stamp being formed to be mechanically more rigid than a section of the frame protruding laterally beyond the pressing plate.

A best possible and low-friction sliding of the metal belts through the press device can be obtained by at least one sliding surface each, coming into contact with a surface section of one of the two metal belts, being arranged on the at least one pressing plate and the at least one pressing surface of the pressing stamp and on the at least one counter-pressure element.

For obtaining an optimal heat input into the laminate, it can be provided that at least one heating plate is arranged on the at least one pressing plate, wherein at least one insulation layer is arranged between the at least one heating plate and the at least one pressing plate, wherein the at least one heating plate and the at least one insulation layer both have at least one passage for the at least one pressing stamp, which passage corresponds with the at least one passage of the pressing plate, and/or a heating plate is arranged on the at least one counter-pressure element, wherein at least one insulation layer is arranged between the at least one counter-pressure element and the at least one heating plate arranged on the at least one counter-pressure element, and/or the at least one pressing stamp has at least one insulation layer. By arranging an insulation layer, a heating of the pressing plate and/or of the counter-pressure element and/or of the pressing stamp can be substantially reduced, which may, for example, prevent thermally induced changes in shape of the same.

According to a preferred embodiment of the invention, it may be provided that at least two, preferably at least three, pressing stamps are arranged one after the other along a longitudinal direction of the press gap running transversely to the belt width of the two metal belts. In this variant of the invention, a progression of the pressing force in the press gap can be adjusted optimally. Thus, the pressure can, for example, increase in the flow direction in order to obtain a higher degree of compaction.

For the purpose of better understanding of the invention, it will be elucidated in more detail by means of the figures below.

Figure 2:
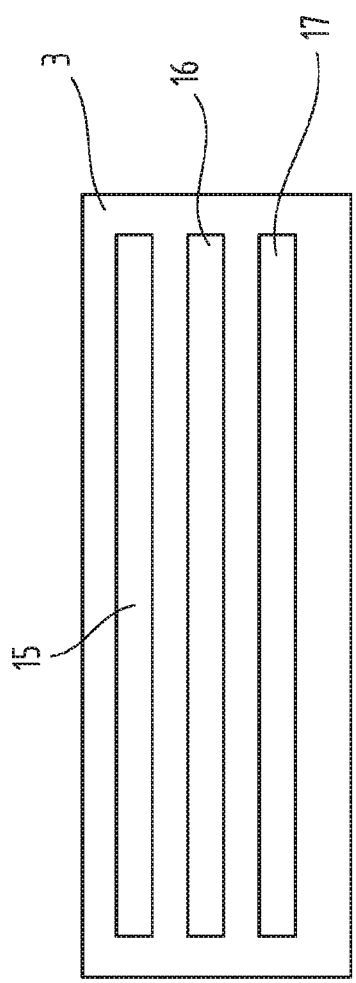

These show in a respectively very simplified schematic representation:

FIG. 1 a double belt press according to the invention;

FIG. 2 a top view of a pressing plate of the double belt press from FIG. 1;

FIG. 3 a cross-section along the line in FIG. 1;

FIG. 4 a cross-section through a press device according to a variant of the invention.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

According to FIG. 1, double belt press 1 according to the invention has a press device 2. The press device 2 is configured as a sliding press and/or a sliding press module and has a pressing plate 3 and a counter-pressure element 4 for the pressing plate 3. The counter-pressure element 4 can also be designed, for instance, in the shape of plates. The pressing plate 3 and the counter-pressure element 4 are arranged so as to be spaced apart from one another. Portions of the first endless and driven metal belt 5 and of a second endless and driven metal belt 6 are guided, opposite one another, through a press gap 7 located between sides of the pressing plate 3 facing one another and the plate-shaped counter-pressure element 4. The press device 2 has pressing stamps 8, 9, 10 having one pressing surface 11, 12, 13 each and being mounted so as to be movable in the direction of the counter-pressure element 4 and back again. The movement directions of the pressing stamps 8, 9, 10 are marked by means of double arrows in FIG. 1.

The pressing stamps 8, 9, 10 are arranged along a longitudinal direction of the press gap 7 running transversely to a belt width of the two metal belts labeled with an m in FIG. 3.

The portions of the first and the second endless metal belt 5, 6 guided through the press gap 7 are guided between the pressing surfaces 11, 12, 13 of the pressing stamp 8, 9, 10 and the counter-pressure element 4. The pressing surfaces 11, 12, 13 of the pressing stamp 8, 9, 10 are smaller than a surface of the side of the pressing plate 3 facing the at least one counter-pressure element 4.

For the sake of completeness, it is noted that each of the metal belts 5, 6 are arranged so as to be circulating, in a manner that is known per se, between two rollers 14a, 14b, 14c, 14d, wherein at least one of the two rollers 14a, 14b, 14c, 14d, between which one of the metal belts 5, 6 is clamped, is driven.

As can be seen in FIG. 2, the pressing plate 3 can have passages 15, 16, 17 for the pressing stamps 8, 9, 10. The pressing stamps 8, 9, 10 are mounted so as to be displaceable through the pressing plate 3.

A length, labeled with an l in FIG. 3, of the pressing surface of the pressing stamp 9 is larger, when viewed in a belt transverse direction q of the two metal belts 5, 6, than a width, labeled with a b in FIG. 1, of the pressing surface of the pressing stamp 9 in the circumferential direction u of the two metal belts 5, 6. At this point, it is noted that the pressing stamps 8, 9, 10 are designed to be equal, so that any and all embodiments in this document with regard to the pressing stamp 9 also apply to all other pressing stamps 8, 10.

The length l of the pressing surface of the pressing stamp 9 is at least two thirds of a belt width m of the metal belts 5, 6. Viewed in the belt transverse direction q of the two metal belts 5, 6, the pressing surface spans at least one belt region of both of the metal belts 5, 6 located on both sides of the belt center so as to be directly adjacent to the belt center. Preferably, the length l of the pressing surface extends over the entire belt width m. In this case, the pressing plate 3 and the counter-pressure element 4 can protrude laterally beyond the belt width m.

The pressing stamp 9 can be connected to first actuators 18a, 18b, while the pressing plate 3 is connected to second actuators 19a, 19b which are independent of the first actuators 18a, 18b. By actuating the actuators 18a, 18b, 19a, 19b, the press gap 7 is reduced and the pressing plate 3 and/or the pressing stamp 9 is pressed against the counter-pressure element 4, which can be arranged so as to be fixed in place. The movement directions of the pressing plate 3 and the pressing stamp 9 are marked by means of double arrows in FIG. 3.

The actuators 18a, 18b, 19a, 19b can be, for example, electric motors, mechanical, electromechanical, pneumatic or hydraulic actuators. Preferably, the actuators 18a, 18b, 19a, 19b are configured as piston/cylinder units, in particular as hydraulic cylinders.

As can be further seen in FIG. 3, the pressing stamp 9 can be mounted on a frame 20 protruding laterally beyond the at least one pressing plate 3 when viewed in the belt transverse direction q of the two metal belts 5, 6. Here, the actuators 18a, 18b can be hinged to a section 20a, 20b of the frame 20 protruding laterally beyond the pressing plate 3 when viewed in the belt transverse direction q of the two metal belts 5, 6. By actuating the actuators 18a, 18b, the frame 20, along with the pressing stamp 9, can be moved in the directions marked by a double arrow.

Particularly preferably, a section 20c of the frame 20 arranged directly above the pressing stamp 9 is formed to be mechanically more rigid than a section 20a, 20b of the frame 20 protruding laterally beyond the pressing plate 3.

In case the actuators 18a, 18b are configured as piston/cylinder units, the pistons of the piston/cylinder units are preferably connected to the laterally protruding section of the frame 20, and the working cylinder of the piston/cylinder units is arranged and supported below the respectively corresponding pistons.

The actuators 18a, 18b, 19a, 19b can, for example, be controlled in a servo-hydraulic or digitally-hydraulic manner Here, the hydraulic cylinders can each be fed with an exactly defined volume content barely differing from one another via pump elements. A pump content represents an "(oil) increment", whereby the synchronization of the piston/cylinder units is ensured by equal volume contents in the feed. Occurring aggregate tolerance errors and possibly leakages can by minimized cyclically by resetting in a basic position.

On the pressing plate 3 and the pressing surface of the pressing stamp 9 as well as on the counter-pressure element 4, one sliding surface 21a, 21b, 21c, 22 each, coming into contact with a surface section of one of the two metal belts 5, 6, can be arranged.

Furthermore, a heating plate 23 can be arranged on the pressing plate 3 according to FIG. 4. An insulation layer 24 can be present between the heating plate 23 and the pressing plate 3. The heating plate 23 and the insulation layer 24 have passages for the pressing stamp 8, 9, 10 corresponding with the passages 15, 16, 17 of the pressing plate 3. Moreover, a heating plate 25 can also be arranged on the counter-pressure element 4. An insulation layer 26 can also be present between the counter-pressure element 4 and the heating plate 25. Moreover, the pressing stamp 9 and/or each of the pressing stamps 8, 9, 10 can have an insulation layer 24a for preventing a thermal deformation of the pressing stamps.

Finally, as a matter of form, it should be noted that for ease of understanding of the structure, elements are partially not depicted to scale and/or are enlarged and/or are reduced in size.

LIST OF REFERENCE NUMBERS 1 double belt press
2 press device
3 pressing plate
4 counter-pressure element
5 metal belt
6 metal belt
7 press gap
8 pressing stamp
9 pressing stamp
10 pressing stamp
11 pressing surface
12 pressing surface
13 pressing surface 14a-d roller
15 passage
16 passage
17 passage
18a, b actuator
19a, c actuator
20 frame
20a-c portion
21a-c sliding surface
22 sliding surface
23 heating plate
24 insulation layer
24a insulation layer
25 heating plate
26 insulation layer

The invention claimed is:

1. A double belt press having at least one press device, wherein the press device has at least one pressing plate and at least one counter-pressure element for the pressing plate,
   wherein the at least one pressing plate and the at least one counter-pressure element are arranged so as to be spaced apart from one another,
   wherein portions of a first endless and driven metal belt and of a second endless and driven metal belt are guided, opposite one another, through a press gap located between sides of the pressing plate facing one another and the plate-shaped counter-pressure element,
   wherein the press device has at least one pressing stamp having a pressing surface, mounted so as to be movable in the direction of the counter-pressure element and back again,
   wherein the portions of the first and the second endless metal belt guided through the press gap are guided between the pressing surface of the at least one pressing stamp and the at least one counter-pressure element, and the pressing surface of the pressing stamp is smaller than a surface of the side of the at least one pressing plate facing the at least one counter-pressure element,
   wherein a length of the pressing surface of the at least one pressing stamp is larger, when viewed in a belt transverse direction of the two metal belts, than a width of the pressing surface of the at least one pressing stamp in the circumferential direction of the two metal belts,
   wherein the length of the pressing surface of the at least one pressing stamp is at least two thirds of a belt width of the metal belts, and the pressing surface, when viewed in the belt transverse direction of the two metal belts, covers at least one belt center and a belt region of both of the metal belts located on both sides of the belt center so as to be directly adjacent to the belt center,
   wherein the at least one pressing stamp is connected to at least one first actuator,
   wherein the pressing plate is connected to a second actuator which is actuated independently of the first actuator,
   wherein the at least one pressing stamp is mounted on a frame protruding laterally beyond the at least one pressing plate when viewed in the belt transverse direction of the two metal belts,
   wherein the at least one actuator is hinged to a section of the frame protruding laterally beyond the pressing plate when viewed in the belt transverse direction of the two metal belts, and
   wherein a section of the frame arranged directly above the pressing stamp is formed to be mechanically more rigid than a section of the frame protruding laterally beyond the pressing plate.

2. The double belt press according to claim 1,
   wherein the at least one pressing plate has at least one passage for the at least one pressing stamp, and
   wherein the at least one pressing stamp is mounted so as to be displaceable through the at least one pressing plate.

3. The double belt press according to claim 1, wherein at least two pressing stamps are arranged one after the other along a longitudinal direction of the press gap running transversely to the belt width of the two metal belts.

* * * * *